United States Patent
Hasegawa et al.

[11] Patent Number: 5,542,307
[45] Date of Patent: Aug. 6, 1996

[54] HYDROSTATIC TRANSMISSION

[75] Inventors: Toshiyuki Hasegawa; Masaru Iida, both of Amagasaki, Japan

[73] Assignee: Kanzaki Kokyukoki Mfg. Co., Ltd., Amagasaki, Japan

[21] Appl. No.: 288,348

[22] Filed: Aug. 10, 1994

[30] Foreign Application Priority Data

Aug. 10, 1993 [JP] Japan ................. 5-198172

[51] Int. Cl.⁶ .................................................. F16H 47/02
[52] U.S. Cl. ................. 74/15.63; 74/720; 74/730.1
[58] Field of Search ................. 74/15.63, 15.66, 74/15.84, 720, 730.1

[56] References Cited

U.S. PATENT DOCUMENTS

| | | | |
|---|---|---|---|
| 2,945,382 | 7/1960 | Ritter et al. | 74/15.63 |
| 3,196,696 | 7/1965 | Ritter | 74/15.63 |
| 3,597,998 | 8/1971 | Ebert | 74/15.66 |
| 3,915,030 | 10/1975 | Ritter | 74/15.63 |
| 4,373,597 | 2/1983 | Itatani et al. | 74/730.1 |
| 4,667,536 | 5/1987 | Ehrlinger et al. | 74/720 |
| 5,394,699 | 3/1995 | Matsufuji | 60/442 |

FOREIGN PATENT DOCUMENTS 63-27758  2/1988  Japan.
4-50180  11/1992  Japan.

*Primary Examiner*—Dirk Wright
*Attorney, Agent, or Firm*—Sterne, Kessler, Goldstein & Fox P.L.L.C.

[57] ABSTRACT

A hydrostatic transmission is provided with a housing, an input shaft supported by and projecting from said housing, a joint disposed on a projecting end of said input shaft, a hydraulic pump disposed in the housing driven by the input shaft, a first output shaft supported by and projecting from the housing, a hydraulic motor disposed in the housing, hydraulically connected with the hydraulic pump, an output connected to the hydraulic motor, a gear transmission disposed in the housing for connecting the output of the hydraulic motor and the first output shaft, a second output shaft supported by and projecting from the housing, a joint disposed on the projecting end of the second output shaft, and a clutch disposed in the housing and selectively operable to connect and disconnect the input shaft and the second output shaft.

19 Claims, 8 Drawing Sheets

HYDROSTATIC TRANSMISSION

BACKGROUND OF THE INVENTION

1. Field of the Invention

The present invention relates to a hydrostatic transmission suitable for various industrial vehicles.

2. Related Art

Hydrostatic transmissions are generally well known. For example, Japanese Utility Model Publication Gazette No. Hei 4-50180 discloses a hydrostatic transmission for an industrial vehicle that vertically disposes the hydraulic pump and hydraulic motor so that the input shaft which is engageable with the hydraulic pump is extended to be utilized as a PTO shaft. This arrangement permits the hydrostatic transmission to drive pumps or accessories in addition to the drive system of the industrial vehicle. When a clutch must be provided for selectively connecting and disconnecting the power of a PTO shaft, the clutch must be disposed outside of the housing because of the lack of required space therein. Therefore, lubrication and/or maintenance of the clutch must be separately carried out, and the transmission as a whole becomes larger.

Similarly, Japanese Utility Model Laid-Open Gazette No. Sho 63-27758 discloses a transaxle, including the axles of drive wheels, for an industrial vehicle to which the hydrostatic transmission of the aforesaid type is attached. In this configuration, the transaxle is equipped with a PTO shaft and is provided with hydraulic operation clutch means for selectively connecting and disconnecting the transaxle from the hydrostatic transmission. The transaxle also includes a stepped gear transmission for changing the torque ratio between an input shaft of the hydrostatic transmission and the wheel axles. Because the clutch means is provided in the axle casing, various sizes of transaxles must be prepared according to the specifications of the target industrial vehicles. This is because the transaxle must also be provided with hydraulic equipment such as a control valve for switching the clutch means. Finally, when the clutch means is a hydraulic operation type, a separate hydraulic power source must also be provided.

Therefore, what is needed is a hydrostatic transmission flexible enough to accommodate a variety of industrial needs, yet without the aforesaid disadvantages.

SUMMARY OF THE INVENTION

The present invention aims at providing a hydrostatic transmission versatile enough to be used with a variety of industrial vehicles. Specifically, the hydrostatic transmission of the present invention includes a housing, an input shaft supported by and projecting from the housing, a joint disposed on a projecting end of the input shaft, a hydraulic pump contained in the housing and driven by the input shaft, a first output shaft supported by and projecting from the housing, a joint disposed on a projecting end of the first output shaft, a hydraulic motor contained in the housing, hydraulically connected to the hydraulic pump and connected with the first output shaft, a second output shaft supported by and projecting from the housing, a joint disposed on a projecting end of the second output shaft, and a clutch means contained in the housing and selectively capable of connecting and disconnecting the input shaft and the second output shaft.

Alternatively, the hydrostatic transmission of the present invention comprises a housing, an input shaft supported by and projecting from the housing, a joint disposed on a projecting end of the input shaft, a hydraulic pump contained in the housing and driven by the input shaft, a first output shaft supported by and projecting from the housing, a joint disposed on a projecting end of the first output shaft, a hydraulic motor contained in the housing, hydraulically connected to the hydraulic pump, output means connected to the hydraulic motor, and a gear transmission disposed in the housing for connecting the output means of the hydraulic motor and the first output shaft.

Alternatively, the hydrostatic transmission of the present invention comprises a housing, an input shaft supported by and projecting from the housing, a joint disposed on a projecting end of the input shaft, a hydraulic pump disposed in the housing and driven by the input shaft, a first output shaft supported by and projecting from the housing, a joint disposed on a projecting end of the first output shaft, a hydraulic motor contained in the housing, hydraulically connected to the hydraulic pump, output means connected to the hydraulic motor, a gear transmission disposed in the housing for connecting the output means of the hydraulic motor with the first output shaft, a second output shaft supported by and projecting from the housing, and a clutch means disposed in the housing, selectively capable of connecting and disconnecting the input shaft and the second output shaft.

In order to apply stepless forward or reverse rotation, the hydraulic pump may further comprise a variable displacement type. A spring bias mechanism connected to the hydraulic pump may further be provided in the housing for automatically returning a variable swash plate to the neutral position. Because the spring bias mechanism is disposed in the housing, the spring bias mechanism is not affected by foreign objects such as dust or rust; thereby proper functionality of the spring bias mechanism is ensured for extended periods of time.

The clutch means may further comprise a hydraulic multi-disc type. With this configuration, the rotational energy of the input shaft can be transmitted to the second output shaft without being accompanied by harsh impact.

The hydrostatic transmission may further comprise a brake device which brakes the second output shaft when the clutch means disengages and which releases the braking action when the clutch means engages. Thus, the second output shaft is safely put in a non-rotatable state when the clutch means is disengaged. Moreover, when the brake device is contained inside the housing, the transmission may be made more compact as a whole.

The hydrostatic invention of the present invention may further comprise a charge pump. The charge pump may be driven by the input shaft to supply oil to the clutch means. This oil supply, supplied to the clutch means via an oil feed circuit, is discharge oil from the fluid circuits which connect the hydraulic pump with the hydraulic motor. With this arrangement, a hydraulic power source dedicated to the clutch means can be eliminated, thereby reducing the cost of the hydrostatic transmission. In addition, drain oil discharged from the oil feed circuit may be sprayed onto the clutch means for low cost cooling and lubrication.

The hydrostatic transmission of the present invention may further comprise a control valve disposed in the housing, and interposed in the oil feed circuit. The control valve permits selective engagement and disengagement of the clutch means.

The hydrostatic transmission of the present invention may further comprise a partition disposed at about the center of the housing. This partition thereby divides one end of the housing into a first open section and a second open section. A first cover and a second cover are mounted at the open ends of the first and second open sections of the housing respectively, thereby forming first and second closed sections in the housing. The hydraulic pump and hydraulic motor are juxtaposed in the first closed section, and the clutch means and gear transmission are juxtaposed in the second closed section, thereby enabling the hydrostatic transmission as a whole to be arranged more compactly.

The first cover of the present invention may further comprise two fluid circuits for connecting the hydraulic pump and the hydraulic motor. This arrangement eliminates independent parts for the two fluid circuits, thereby enabling the hydrostatic transmission of the invention to be manufactured at lower cost.

The first output shaft may further project outwardly from both sides of the housing, and the joint disposed thereon may be provided at both ends of the first output shaft. In this configuration, the hydrostatic transmission of the present invention is directly compatible with four-wheel-drive industrial vehicles.

The output means of the hydraulic motor may further comprise a tubular shaft, with the first output shaft inserted therein. This arrangement further contributes to miniaturization of the hydrostatic transmission of the present invention.

The gear transmission of the present invention may further comprise an intermediate shaft, a first gear and a second gear affixed thereto, a third gear affixed to the output means, a fourth gear freely fitted onto the first output shaft, and a clutch member disposed on the first output shaft, rotationally fixed relative to the first output shaft and axially slidable on the first output shaft.

These and other objects, features and advantages of the present invention will become more apparent upon a reading of the following detailed specification and drawings, in which:

DETAILED DESCRIPTION OF THE PREFERRED EMBODIMENTS

Figure 1:
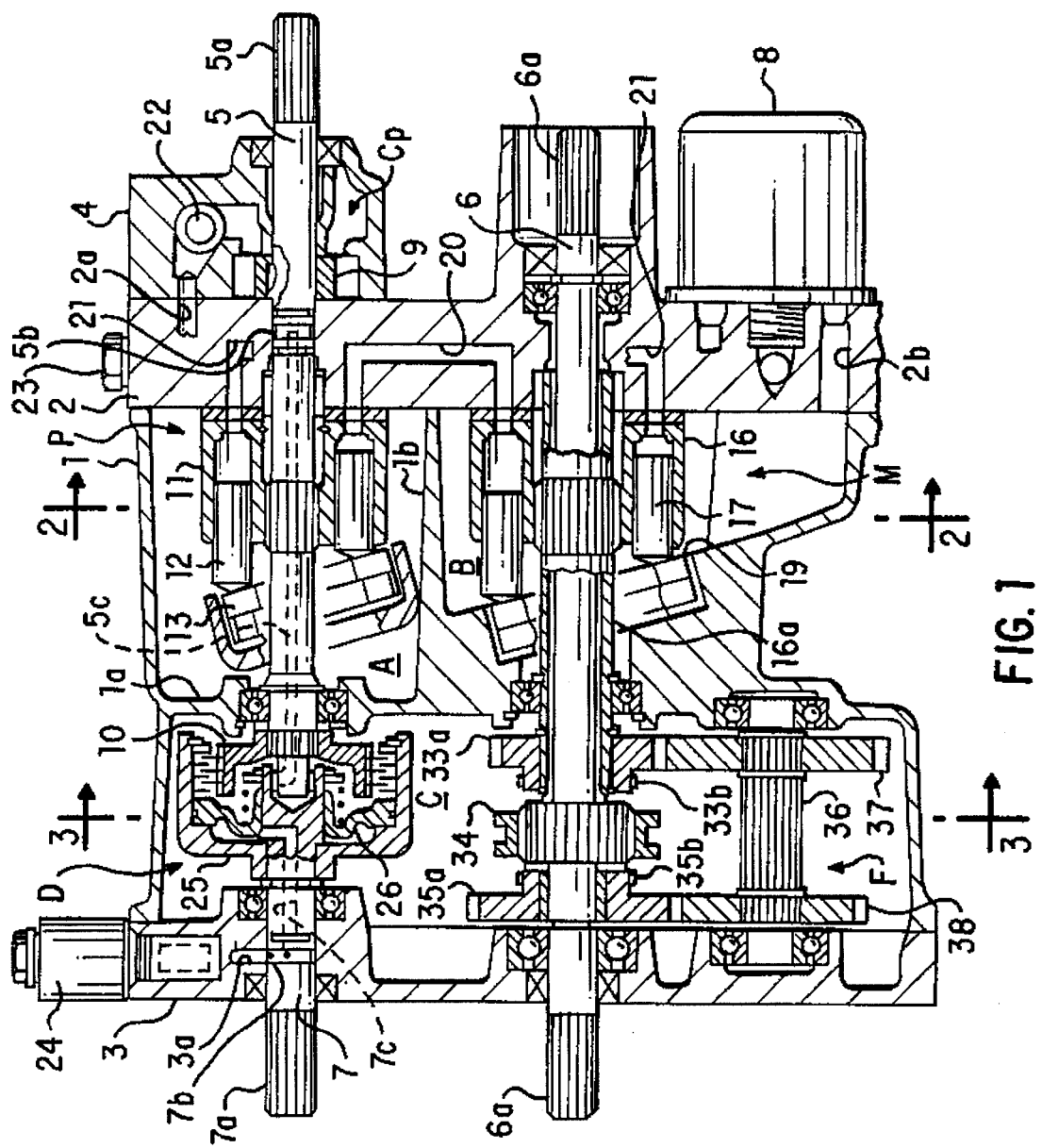
FIG. 1 is a developed sectional side view of a hydrostatic transmission of the present invention.

Referring to FIG. 1, a housing 1 of the hydrostatic transmission of the present invention is provided with a front cover 2 and a rear cover 3, with front and rear openings of housing 1 closed by covers 2 and 3 respectively. Attached to the front upper portion of front cover 2 is a charge pump casing 4 housing therein a charge pump CP. Input shaft 5 and a first output shaft 6 are disposed in parallel to each other in the front cover 2 and housing 1, and are each journalled thereto through bearings. A second output shaft 7 is journalled to rear cover 3 through a bearing.

Partition 1a is disposed at about the center of housing 1 in the lengthwise direction, substantially perpendicular to input shaft 5, to form a first section A/B between front cover 2 and partition 1a. Partition 1b extends frontward from about the center of partition 1a, substantially parallel to input shaft 5, so that the first section is vertically divided into a pump chamber A and a motor chamber B. A second section C is formed between rear cover 3 and partition 1a. Partition 1b may be omitted. Oil filter 8 is attached to the lower front surface of front cover 2 so that oil in motor chamber B is taken into oil filter 8 through an opening 2b in front cover 2. Filtered oil is then taken into a suction port of charge pump CP.

Second output shaft 7 is disposed on an extension line of input shaft 5 coaxially and axially opposite thereto, and abutments therebetween are disposed in second section C of housing 1 so that driving power is transmitted from input shaft 5 to second output shaft 7 through clutch means D. The abutments of input shaft 5 and second output shaft 7 are alternately journalled through respective needle bearings.

Clutch means D is a hydraulic multi-disc type. Specifically, a clutch casing 25 is disposed at one end of second output shaft 7, and includes a piston 26 biased by an internal spring. A friction plate support 10 is disposed at one end of input shaft 5. A plurality of friction plates are provided in layers between friction plate support 10 and clutch casing 25, thereby forming clutch means D.

A rotary joint unit 7b is disposed within a bore through which second output shaft 7 is inserted, and the outer peripheral surface of second output shaft 7 is in contact with the inner peripheral surface of the bore. Rotary joint unit 7b is hydraulically connected to piston 26 of clutch means D through an oil passage 7c provided in second output shaft 7.

Operating oil, when introduced into rotary joint unit 7b, flows through oil passage 7c to forwardly move piston 26 to press the friction plates in contact with each other and to thereby engage clutch means D.

A rotary joint unit 5b is disposed within a bore at front cover 2 through which input shaft 5 is inserted, and the outer peripheral surface of input shaft 5 is in contact with the inner peripheral surface of the bore. Rotary joint unit 5b is open at the friction plates of clutch means D, connected through an oil passage 5c provided in input shaft 5.

Drain oil is guided into rotary joint unit 5b by a hydraulic circuit discussed below, whereby the friction plates of clutch means D are always lubricated and cooled. One axial end of second output shaft 7 includes a spline joint 7a that projects from rear cover 3 so as to enable other accessories to be driven. One axial end of input shaft 5 includes a spline joint 5a that projects from front cover 2 so as to permit transfer of driving power from an output shaft of an engine to input shaft 5.

Input shaft 5 drives charge pump CP, which includes a pump gear 9. In this embodiment, pump gear 9 is directly driven by input shaft 5, but transmission means such as gears may be used to indirectly drive pump gear 9 from input shaft 5.

Figure 2:
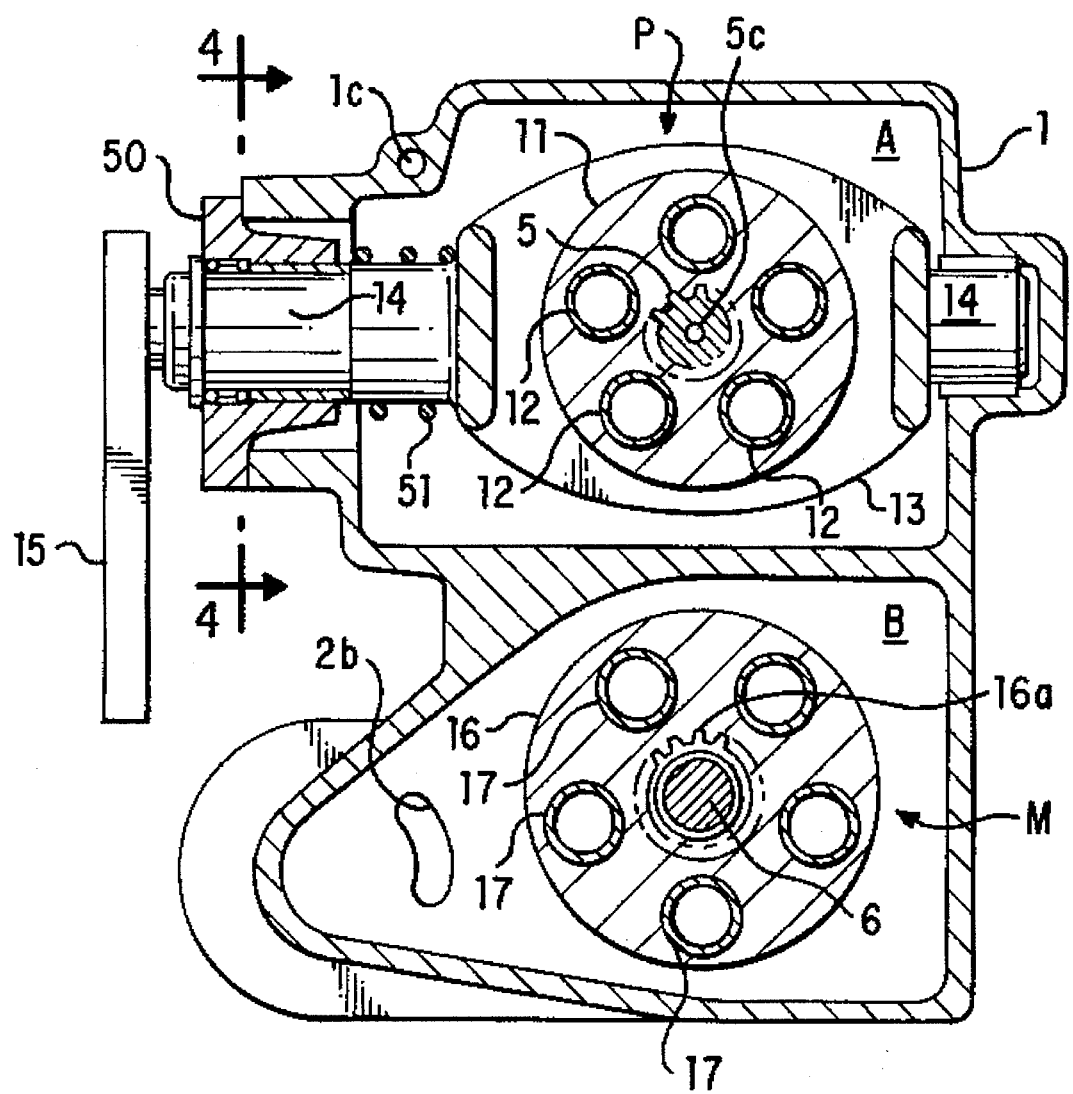
FIG. 2 is a sectional view taken on the line X—X in FIG. 1.
Figure 4:
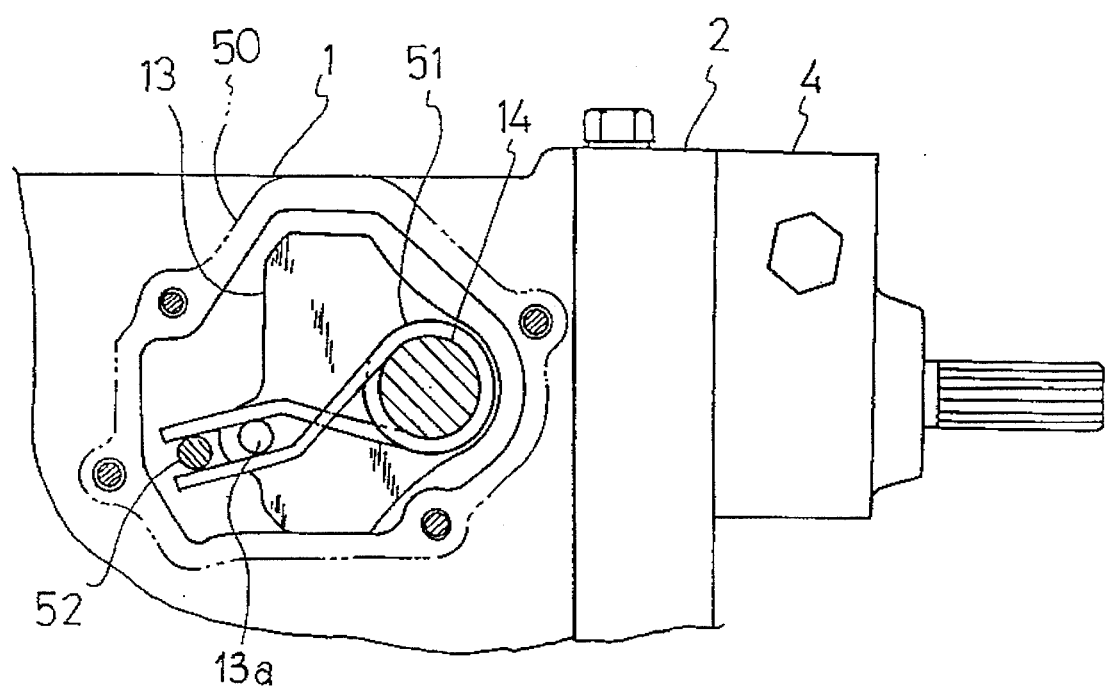
FIG. 4 is sectional view taken on the line Z—Z in FIG. 2.

Input shaft 5 also drives hydraulic pump P housed in pump chamber A. Hydraulic pump P is a variable displacement axial piston type, comprising: a cylinder block 11, a plurality of pistons 12 disposed in cylinder block 11, movable in reciprocation and rotatably and slidably mounted to a pump mounting surface formed at the upper inner-surface of front cover 2. In this embodiment, a rotary axial portion of cylinder block 11 is provided with splines for inputting the driving power. Input shaft 5 is directly inserted into the neutral portion so as to be spline-engaged therewith. Alternatively, a pump shaft may be separately provided so as to indirectly couple the splines with respect to input shaft 5 by use of transmission means such as gears. The heads of pistons 12 abut against a movable swash plate 13. As shown in FIG. 2, movable swash plate 13 is supported at both sides thereof by trunnion shafts 14. Trunnion shafts 14 are rotatably supported by housing 1 and a side cover 50, and one trunnion shaft 14 projects outwardly from housing 1 and connects to a first speed change lever 15 so as to enable movable swash plate 13 to be changeable of angle. As shown in FIG. 4, movable swash plate 13 is disposed in pump chamber A and extends through an opening in the side wall of housing 1, with the opening closed by side cover 50.

A torsion spring 51 is wound onto trunnion shaft 14 and is supported by side cover 50. Both ends of torsion spring 51 extend in the same direction and cross each other approximately halfway so as to sandwich a movable pin 13a between the extended ends of torsion spring 51. Movable pin 13a is disposed on the side surface of movable swash plate 13, and a fixed pin 52 is disposed on the inner surface of side cover 50. Thus, torsion spring 51 supplies a restoring force to swash plate 13 to return swash plate 13 to the neutral position relative to fixed pin 52.

A fixed displacement axial piston hydraulic motor M is housed in motor chamber B, and comprises: a cylinder block 16 including a plurality of pistons 17 capable of being reciprocally rotated and slidably mounted onto a motor mounting surface formed at the lower inner surface of front cover 2. A bore is provided along the rotary axis of cylinder block 16 with splines for harnessing the driving power. A tubular output shaft 16a is inserted into the bore to thereby spline-engage output shaft 16a with cylinder block 16. A fixed swash plate 19 is disposed inside partition la, and the heads of pistons 17 abut against fixed swash plate 19.

Figure 5:
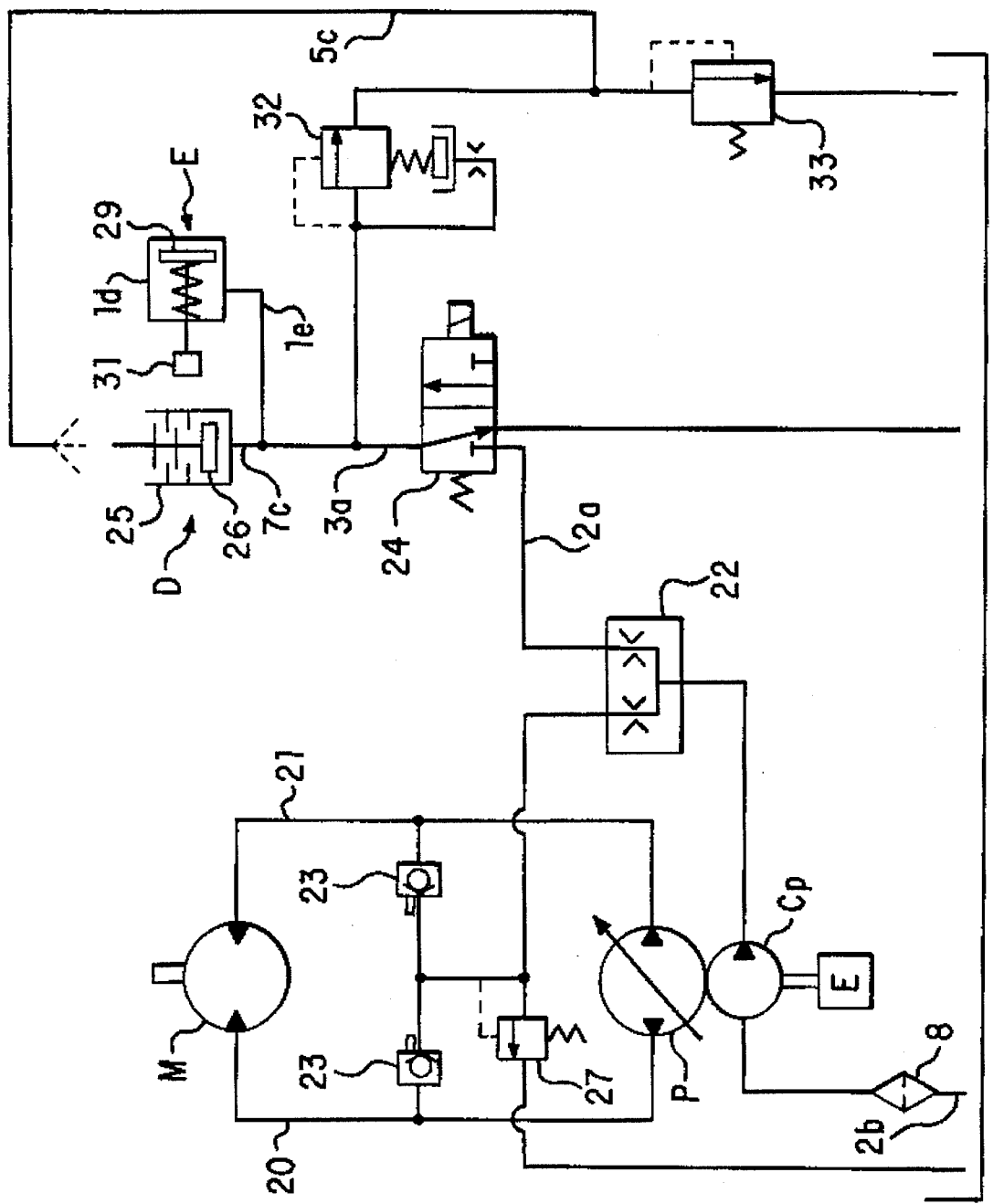
FIG. 5 is a hydraulic circuit diagram.

Front cover 2 also serves as a center section for the hydrostatic transmission. Bored pairs of kidney ports and a pair of oil passages (20 and 21) are provided on the pump chamber and motor chamber mounting surfaces at the inner surface of cover 2 (see FIG. 5). These ports and passages are connected with each other so that a closed circuit through which operating oil circulates is formed between hydraulic pump P and hydraulic motor M. Accordingly, the combination of hydraulic pump P and hydraulic motor M enables tubular output shaft 16a to selectively rotate forwardly and reversely, thus constituting a stepless speed changeable hydrostatic transmission. A gear 33a is fixed onto one end of hollow output shaft 16a, projecting into second section C.

First output shaft 6 is disposed within tubular output shaft 16a, and is rotatably supported by bearings disposed in front cover 2 and rear cover 3. Spline joints 6a are provided at both the front and rear axial ends of first output shaft 6, which project outwardly from housing 1 so as to enable the driving power to be transmitted to front wheels and/or rear wheels of industrial vehicles. A spline-fitted clutch member 34 is disposed on first output shaft 6 in second section C. A gear 33a is disposed along one side of clutch member 34, and a gear 35a is disposed along the other side, with gear 35a being freely rotatably fitted onto first output shaft 6.

Figure 3:
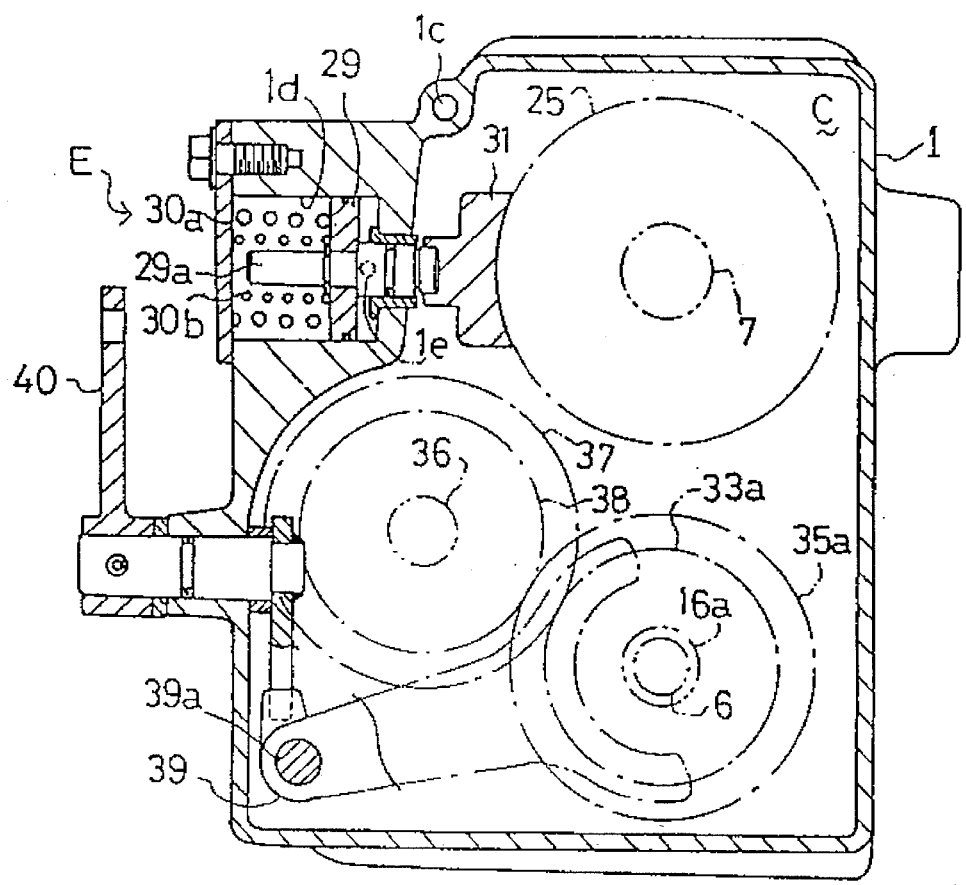
FIG. 3 is a sectional view taken on the line Y—Y in FIG. 1.

Clutch member 34 is provided with internal teeth which are selectively engageable with teeth 33b of gear 33a and teeth 35b of gear 35a. As shown in FIG. 3, clutch member 34 is slid by a slide fork 39. Slide fork 39 is axially slidable on fork shaft 39a by the rotation of a second speed change lever 40. Gears 35a and 33a are always engaged with gears 37 and 38 which are disposed on an intermediate shaft 36 journalled across housing 1 and rear cover 3 so as to constitute a two-stage gear transmission F. Second speed change lever 40 is operated to enable the torque ratio of first output shaft 6 to be selectively changeable between two stages (high and low).

Discharge oil from charge pump CP is supplied to the closed circuit of the hydrostatic transmission through a flow dividing valve 22 and check valves 23. Relief valve 27 permits adjustment of the pressure of the discharged oil.

Flow dividing valve 22 is disposed in pump casing 4, and divides the discharged oil of charge pump CP into two flows. One flow is sent to a supply port at the closed circuit, and the other is sent to the primary side of an electromagnetic control valve 24 provided on rear cover 3. This flow travels through oil passage 2a (in FIG. 1), oil passage 1c of housing 1 (in FIGS. 2 and 3) and an oil passage at rear cover 3. The secondary side of control valve 24 is connected to rotary joint 7b of second output shaft 7 through oil passage 3a.

When control valve 24 is switched to introduce operating oil into rotary joint 7b, clutch means D engages. In addition, a braking device E is provided which brakes second output shaft 7 when clutch means D is disengaged.

As shown in FIG. 3, braking device E is disposed laterally with respect to clutch means D. Braking device E includes a cylinder 1d housing therein a piston 29 disposed laterally in the side wall of second section C of housing 1. One axial end of a piston rod 29a is affixed to the center of piston 29, and projects into second section C with a brake pad 31 capable of abutting against clutch casing 25. Springs 30a and 30b are fitted onto the other axial end of piston rod 29a so as to bias brake pad 31 against clutch casing 25. An oil passage 1e connects with cylinder 1d at the reverse side of the spring, and connects with oil passage 3a at the secondary side of control valve 24. Hence, when clutch means D disengages, brake pad 31 abuts against clutch casing 25, thereby braking second output shaft 7.

Operating oil flowing in oil passage 3a is gradually increased in pressure up to a predetermined value by a delay type relief value 32. An oil passage for lubricating the friction plates is branched from the relief circuit of the delay type relief valve 32 so as to connect with oil passage 5c through rotary joint 5b. The relief circuit is provided with a separate relief valve 33 by which the lubricating oil pressure thereof is regulated.

With this construction, when input shaft 5 is driven by a driving source such as an engine, hydraulic pump P is driven. When first speed change lever 15 is turned to slant movable swash plate 13, the oil feeding direction and pressure are determined according to the rotation direction and amount; thus tubular output shaft 16a of hydraulic motor M is given a direction and rate of rotation corresponding to the oil feeding direction and amount. When clutch member 34 of gear transmission F is selectively engaged with gear 33a, first output shaft 6 outputs a high-rotation-low-torque through tubular output shaft 16a, gear 33a and clutch member 34. When clutch member 34 is selectively engaged with gear 35, first output shaft 6 outputs a low-rotation high-torque through tubular output shaft 16a, gear 33a, gear 37, intermediate shaft 36, gear 38, gear 35a and clutch member 34.

Figure 6:
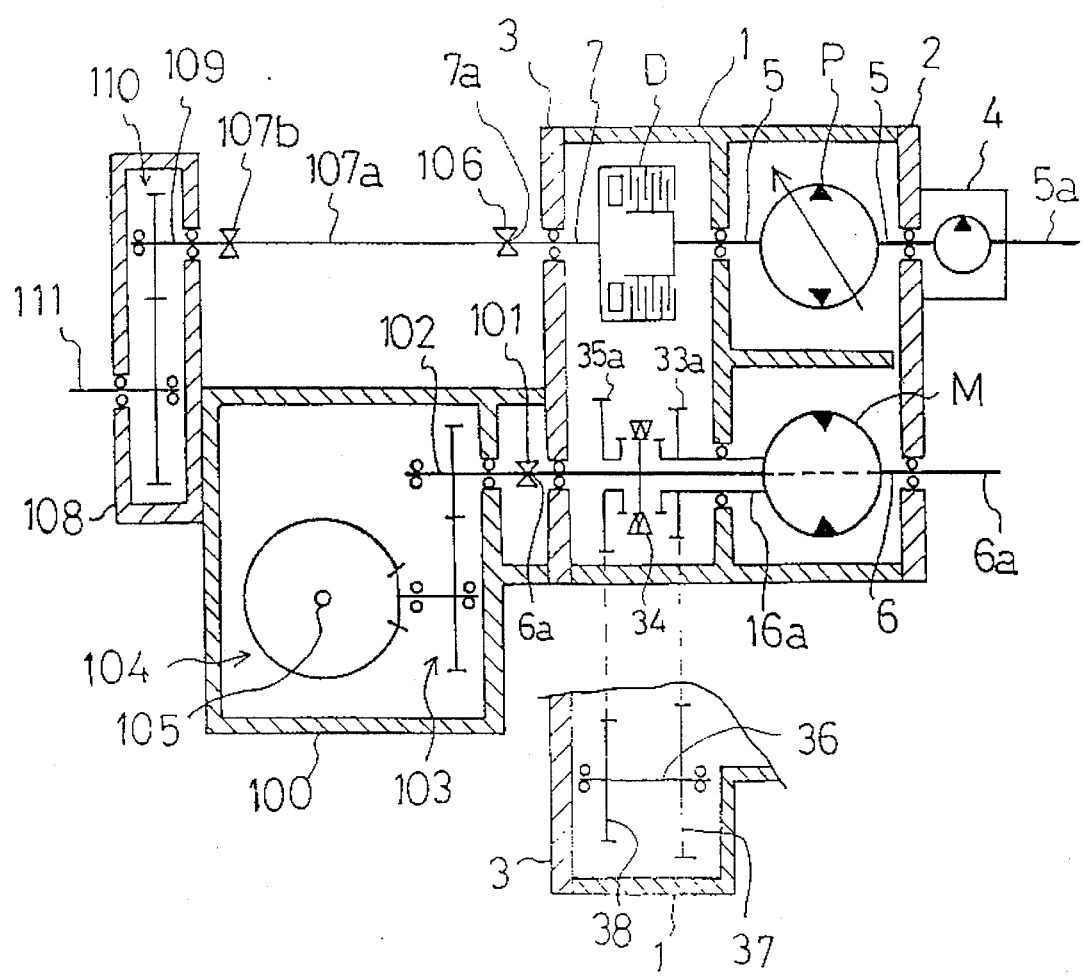
FIG. 6 is a typical view of a transaxle on which the hydrostatic transmission of the present invention is mounted.
Figure 7:
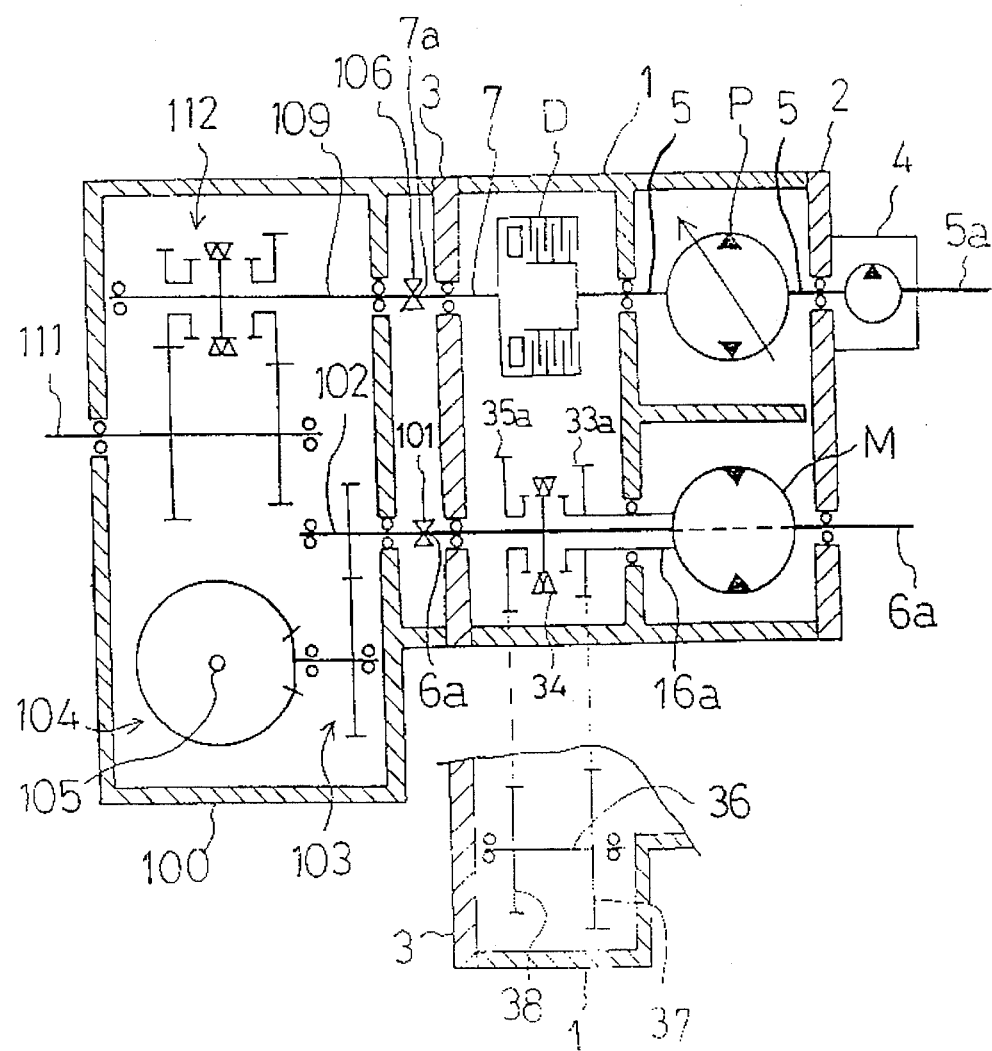
FIG. 7 is a typical view of a hydraulic transmission on which the hydrostatic transmission of the present invention is mounted.
Figure 8:
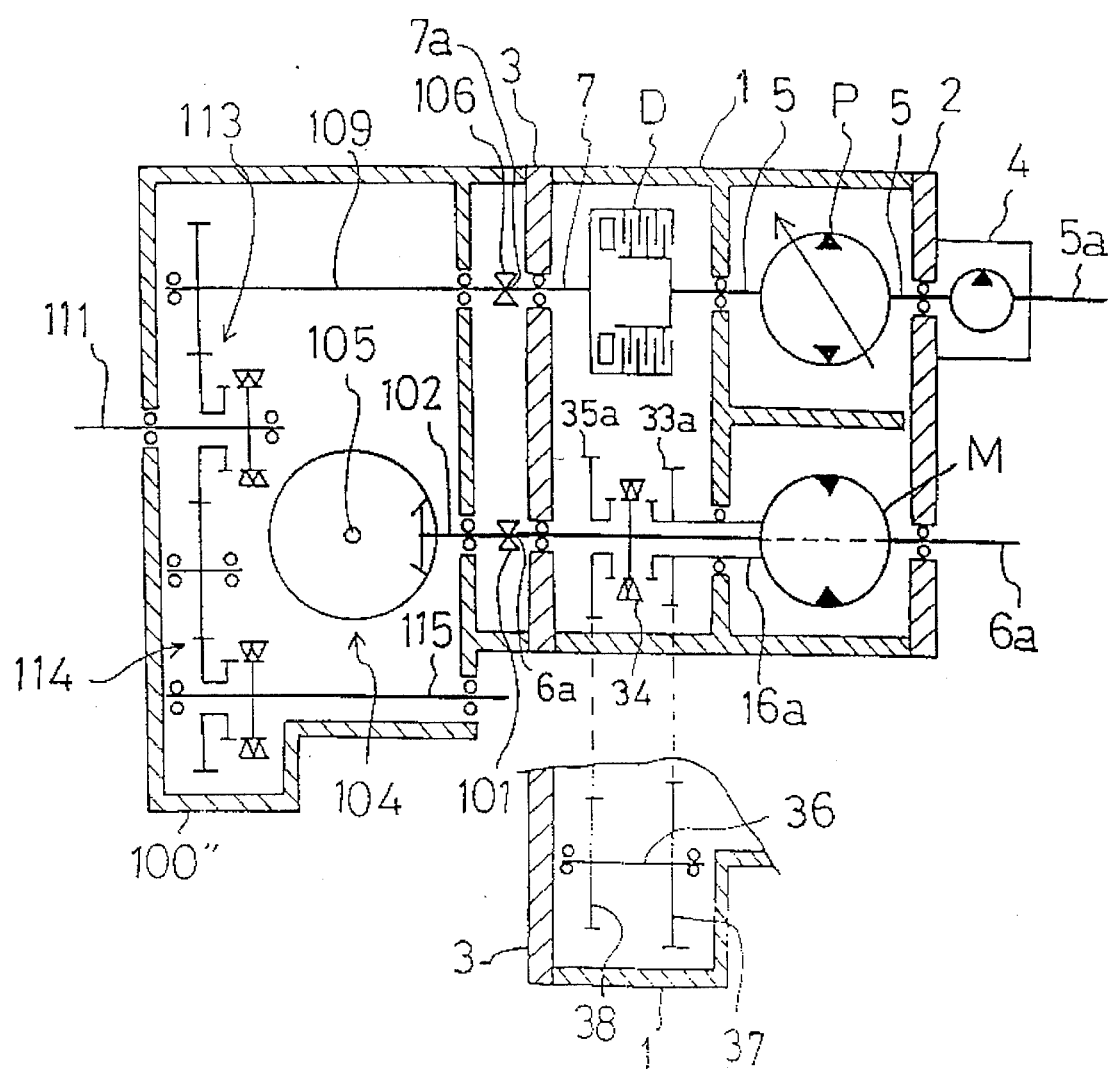
FIG. 8 is a typical view of a transaxle on which the hydrostatic transmission of the present invention is mounted.

When clutch means D is selectively engaged by control valve 24, the rotation of input shaft 5 is outputted through output shaft 7. The hydrostatic transmission constructed as aforementioned can be mounted as a versatile power unit for industrial vehicles of various specifications. The hydrostatic transmission can be used, for example, with transaxles as shown in FIGS. 6, 7 and 8, in which rear cover 3 functions as a mounting base with respect to the transaxles, second output shaft 7 serves as a drive source for the PTO shaft, and first output shaft 6 serves as a drive source for the axles. As shown in FIG. 6, reference numeral 100 depicts a transaxle casing to which the hydrostatic transmission is mounted. A reduction gear mechanism 103, differential gear 104, and an axle 105 are contained in casing 100 and are connected with each other. A joint part 101 is mounted to joint 6a of first output shaft 6 projecting from rear cover 3, and input shaft 102 is connected to first output shaft 6. Also, a PTO casing 108 having a reduction gear mechanism 110 and a rear PTO shaft 111 is mounted at the rear wall of transaxle casing 100. An input shaft 109 entering therein is connected through a joint part 107b, a joint shaft 107a and a joint part 106, with joint 7a of second output shaft 7 projecting from rear cover 3.

Input shaft 109 and PTO shaft 111 are integrally housed in transaxle casing 100 as shown in FIG. 7. A stepwise transmission 112 is disposed between input shaft 109 and rear PTO shaft 111 for changing the output torque ratio. Joint 7a of second output shaft 7 and joint 6a of first output shaft 6 are connected to the from ends of input shaft 109 for rear PTO shaft 111 and of input 102 for axle 105 through joint pans 106 and 101. Also, as shown in FIG. 8, within transaxle casing 100 input shaft 102 is connected to differential gear 104 through joint 6a of first output shaft 6, and through a bevel gear. In addition, a mid-PTO shaft 115 is provided in addition to a rear PTO shaft 111.

A clutch means 113 is provided for selectively connecting and disconnecting input shaft 109 (connected to second output shaft 7) and rear PTO shaft 111. A clutch means 114 is provided for selectively connecting and disconnecting input shaft 109 and mid-PTO shaft 115 so that the combination of the switching can drive rear PTO shaft 111 only, mid PTO shaft 115 or both PTO shafts. Other forms of transaxles equipped with the hydrostatic transmission of the present invention are also possible.

Although several embodiments have been described, they are merely exemplary of the invention and not to be construed as limiting, the invention being defined solely by the appended claims.

What is claimed is:

1. A hydrostatic transmission, comprising:
   a housing;
   an input shaft supported by and projecting outwardly from said housing;
   a hydraulic pump disposed in said housing and driven by said input shaft;
   a first output shaft supported by and projecting outwardly from said housing;
   a hydraulic motor disposed in said housing, hydraulically connected to said hydraulic pump, and connected with said first output shaft;
   a second output shaft supported by and projecting outwardly from said housing;
   a clutch means operable to selectively connect and disconnect said input shaft and said second output shaft; and
   a braking device disposed in said housing which brakes said second output shaft when said clutch means is disengaged, and which releases a braking action to said second output shaft when said clutch means is engaged.

2. A hydrostatic transmission according to claim 1, wherein said hydraulic pump is a variable displacement type.

3. A hydrostatic transmission according to claim 2, further comprising a spring bias mechanism disposed in said housing for automatically restoring a movable swash plate of said hydraulic pump to a neutral position.

4. A hydrostatic transmission according to claim 1, wherein said clutch means is a hydraulic-operated and spring-released type, said braking device is a spring-operated and hydraulic-released type, and further comprising a charge pump driven by said input shaft so that oil discharged from said charge pump is supplied to an oil feed circuit of said clutch means and braking device.

5. A hydrostatic transmission, comprising:
   a housing;
   an input shaft supported by and projecting outwardly from said housing;
   a hydraulic pump disposed in said housing and driven by said input shaft;
   a first output shaft supported by and projecting outwardly from said housing;
   a hydraulic motor disposed in said housing, hydraulically connected to said hydraulic pump, and connected with said first output shaft;
   a second output shaft supported by and projecting outwardly from said housing;
   a clutch means operable to selectively connect and disconnect said input shaft and said second output shaft; and
   a cover for covering an opening of said housing, said cover including a fluid circuit for connecting said hydraulic pump and said hydraulic motor.

6. A hydrostatic transmission according to claim 5, wherein said hydraulic pump is a variable displacement type.

7. A hydrostatic transmission according to claim 6, further comprising a spring bias mechanism disposed in said housing for automatically restoring a movable swash plate of said hydraulic pump to a neutral position.

8. A hydrostatic transmission according to claim 5, wherein said clutch means is a hydraulic-operated type and further comprising a charge pump driven by said input shaft so that a portion of oil discharged from said charge pump is supplied to said fluid circuit for connecting said hydraulic pump and said hydraulic motor and a portion of the oil discharged from said charge pump is supplied to an oil feed circuit of said clutch means.

9. A hydrostatic transmission, comprising:
   a housing;
   an input shaft supported by and projecting outwardly from said housing;
   a hydraulic pump disposed in said housing and driven by said input shaft;
   a first output shaft supported by and projecting outwardly from said housing;
   a hydraulic motor disposed in said housing, hydraulically connected to said hydraulic pump, and connected with said first output shaft;
   a second output shaft supported by and projecting outwardly from said housing;
   a hydraulic multi-disc clutch operable to selectively connect and disconnect said input shaft and said second output shaft; and a charge pump driven by said input shaft, wherein a portion of oil discharged from said charge pump is supplied to fluid circuits for connecting said hydraulic pump and said hydraulic motor and another portion of the oil discharged from said charge pump is supplied to an oil feed circuit of said clutch.

10. A hydrostatic transmission according to claim 9, wherein said hydraulic pump is a variable displacement type.

11. A hydrostatic transmission according to claim 10, further comprising a spring bias mechanism disposed in said housing for automatically restoring a movable swash plate of said hydraulic pump to a neutral position.

12. A hydrostatic transmission according to claim 10, wherein drain oil discharged from said oil feed circuit is sprayed onto said clutch to provide cooling and lubrication.

13. A hydrostatic transmission according to claim 10, further comprising a control valve disposed in said housing and connected to said oil feed circuit for selectively connecting and disconnecting said clutch.

14. A hydrostatic transmission, comprising:
a housing;
an input shaft supported by and projecting outwardly from said housing;
a joint disposed on one end of said input shaft;
a hydraulic pump disposed in said housing and driven by said input shaft;
a first output shaft supported by and projecting from said housing;
a joint disposed on a projecting end of said first output shaft;
a hydraulic motor housed in said housing, hydraulically connected with said hydraulic pump;
output means connected to said hydraulic motor; and
a gear transmission disposed in said housing for connecting said output means of said hydraulic motor and said first output shaft, wherein said gear transmission further comprises,
an intermediate shaft,
a first gear disposed on said intermediate shaft,
a second gear disposed on said intermediate shaft,
a third gear disposed on said output means, engaged with said first gear,
a fourth gear disposed on and freely rotatable with respect to said first output shaft, and engaged with said second gear, and
a clutch member disposed on said first output shaft, rotatably affixed to said first output shaft, axially slidable with respect to said first output shaft, and selectively connecting said first output shaft and said output means, and said first output shaft and said intermediate shaft.

15. A hydrostatic transmission according to claim 14, wherein said output means of said hydraulic motor is tubular and said first output shaft is disposed therein.

16. A hydrostatic transmission according to claim 15, wherein said first output shaft projects outward at both axial ends thereof from opposite sides of said housing, and includes a second joint disposed on a second projecting end of said first output shaft.

17. A hydrostatic transmission comprising:
a housing, wherein said housing includes,
(a) a first opening formed on one end, a second opening formed on another end and a partition formed at approximately a center of the housing,
(b) a first cover for closing said first opening, and
(c) a second cover for covering said second opening, wherein a first section of said housing is between said first cover and said partition, and a second section of said housing is between said second cover and said partition;
an input shaft supported by and projecting outwardly from said housing;
a joint disposed on a projecting end of said input shaft;
a hydraulic pump disposed in said first section, mounted on said first cover, and driven by said input shaft;
a first output shaft supported by and projecting outwardly from said housing;
a joint disposed on a projecting end of said first output shaft;
a hydraulic motor disposed in said first section and mounted on said first cover, wherein said first cover includes a fluid circuit for hydraulically connecting said hydraulic pump and said hydraulic motor;
output means connected to said hydraulic motor;
a gear transmission disposed in said second section for connecting said output means of said hydraulic motor and first output shaft;
a second output shaft supported by and projecting from said housing;
a joint disposed on a projecting end of said second output shaft; and
a clutch means disposed in said second section operable to selectively connect and disconnect said input shaft and second output shaft.

18. A hydrostatic transmission according to claim 17, wherein said clutch means is a hydraulic-operated type and further comprising a charge pump driven by said input shaft so that a portion of oil discharged from said charge pump is supplied to said fluid circuit for connecting said hydraulic pump and said hydraulic motor and a portion of the oil discharged from said charge pump is supplied to an oil feed circuit of said clutch means.

19. A hydrostatic transmission according to claim 17, further comprising a braking device which is spring-operated and hydraulic-released type disposed in said second section for braking said second output shaft, and a charge pump driven by said input shaft, wherein said clutch means is a hydraulic-operated and spring-released type, oil discharged from said charge pump is selectively supplied to an oil feed circuit of said clutch means and braking device, whereby said braking device brakes said second output shaft when said clutch means is disengaged and which releases the braking action to said second output shaft when said clutch means is operated.

* * * * *

UNITED STATES PATENT AND TRADEMARK OFFICE
CERTIFICATE OF CORRECTION

PATENT NO. : 5,542,307
DATED : August 6, 1996
INVENTOR(S) : Hasegawa, et. al.

It is certified that error appears in the above-indentified patent and that said Letters Patent is hereby corrected as shown below:

Column 9, claim 12, line 1, change "10" to --9--.

claim 13, line 1, change "10" to --9--.

Signed and Sealed this

Seventeenth Day of December, 1996

Attest:

BRUCE LEHMAN

*Attesting Officer*     *Commissioner of Patents and Trademarks*